United States Patent
Tanaka

(10) Patent No.: US 10,415,490 B2
(45) Date of Patent: Sep. 17, 2019

(54) CONTROL APPARATUS FOR INTERNAL COMBUSTION ENGINE

(71) Applicant: TOYOTA JIDOSHA KABUSHIKI KAISHA, Toyota-shi, Aichi-ken (JP)

(72) Inventor: Takayoshi Tanaka, Susono (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 107 days.

(21) Appl. No.: 15/577,391

(22) PCT Filed: May 25, 2016

(86) PCT No.: PCT/JP2016/065459
§ 371 (c)(1),
(2) Date: Nov. 28, 2017

(87) PCT Pub. No.: WO2016/194735
PCT Pub. Date: Dec. 8, 2016

(65) Prior Publication Data
US 2018/0171910 A1    Jun. 21, 2018

(30) Foreign Application Priority Data

May 29, 2015   (JP) .................................. 2015-110164
May 19, 2016   (JP) .................................. 2016-100368

(51) Int. Cl.
*F02D 41/02*     (2006.01)
*F01N 3/08*      (2006.01)
(Continued)

(52) U.S. Cl.
CPC ....... *F02D 41/025* (2013.01); *B01D 53/9418* (2013.01); *B01D 53/9422* (2013.01);
(Continued)

(58) Field of Classification Search
CPC .......... B01D 2255/50; B01D 2255/904; B01D 2255/91; B01D 53/9418; B01D 53/9422; B01D 53/9445; B01D 53/9477; B01D 53/9495; F01N 13/009; F01N 2430/06; F01N 2560/025; F01N 2560/026;
(Continued)

(56) References Cited

FOREIGN PATENT DOCUMENTS

JP    4542455       9/2010
JP    2012-237296   12/2012

*Primary Examiner* — Audrey K Bradley
*Assistant Examiner* — Anthony Ayala Delgado
(74) *Attorney, Agent, or Firm* — Finnegan, Henderson, Farabow, Garrett & Dunner, LLP

(57) ABSTRACT

A control apparatus is applicable to an internal combustion engine having an exhaust passage arranged with an NSR catalyst and an SCR catalyst, wherein when it is necessary to decrease $NH_3$ adsorbed to the SCR catalyst, then an air-fuel ratio of an air-fuel mixture to be combusted in the internal combustion engine is controlled to a predetermined lean air-fuel ratio which is higher than a theoretical air-fuel ratio if a temperature of the SCR catalyst is not less than a lower limit temperature at which $NH_3$ can be oxidized, while the air-fuel ratio of the air-fuel mixture to be combusted in the internal combustion engine is controlled to a predetermined weak lean air-fuel ratio which is lower than the predetermined lean air-fuel ratio and which is higher than the theoretical air-fuel ratio if the temperature of the SCR catalyst is less than the lower limit temperature.

8 Claims, 6 Drawing Sheets

(51) Int. Cl.
*F01N 3/10* (2006.01)
*F01N 3/20* (2006.01)
*F02D 41/14* (2006.01)
*F01N 13/00* (2010.01)
*B01D 53/94* (2006.01)
*F02D 13/02* (2006.01)
*F02P 5/04* (2006.01)

(52) U.S. Cl.
CPC ..... *B01D 53/9445* (2013.01); *B01D 53/9477* (2013.01); *B01D 53/9495* (2013.01); *F01N 3/0814* (2013.01); *F01N 3/0842* (2013.01); *F01N 3/0871* (2013.01); *F01N 3/101* (2013.01); *F01N 3/208* (2013.01); *F01N 3/2066* (2013.01); *F01N 3/2073* (2013.01); *F01N 13/009* (2014.06); *F02D 13/0249* (2013.01); *F02D 41/1441* (2013.01); *F02D 41/1454* (2013.01); *F02D 41/1461* (2013.01); *F02D 41/1463* (2013.01); *F02D 41/1475* (2013.01); *F02P 5/04* (2013.01); *B01D 2255/2092* (2013.01); *B01D 2255/20738* (2013.01); *B01D 2255/20784* (2013.01); *B01D 2255/50* (2013.01); *B01D 2255/904* (2013.01); *B01D 2255/91* (2013.01); *F01N 2430/06* (2013.01); *F01N 2560/025* (2013.01); *F01N 2560/026* (2013.01); *F01N 2560/06* (2013.01); *F01N 2560/14* (2013.01); *F01N 2610/02* (2013.01); *F01N 2900/1602* (2013.01); *F01N 2900/1622* (2013.01); *F02D 2200/0802* (2013.01); *F02D 2200/0806* (2013.01); *F02D 2250/36* (2013.01); *Y02T 10/22* (2013.01); *Y02T 10/24* (2013.01)

(58) Field of Classification Search
CPC ............ F01N 2560/06; F01N 2560/14; F01N 2610/02; F01N 2900/1602; F01N 2900/1622; F01N 3/0814; F01N 3/0842; F01N 3/0871; F01N 3/101; F01N 3/2066; F01N 3/2073; F01N 3/208; F02D 13/0249; F02D 2200/0802; F02D 2200/0806; F02D 2250/36; F02D 41/025; F02D 41/1441; F02D 41/1454; F02D 41/1461; F02D 41/1463; F02D 41/1475; Y02T 10/22; Y02T 10/24
See application file for complete search history.

[Fig. 1]
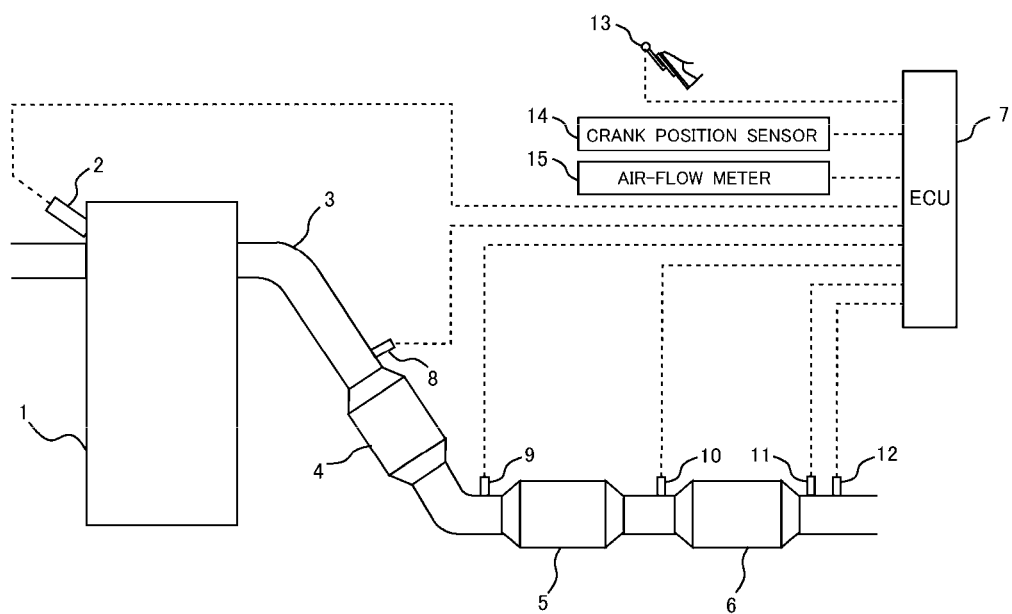

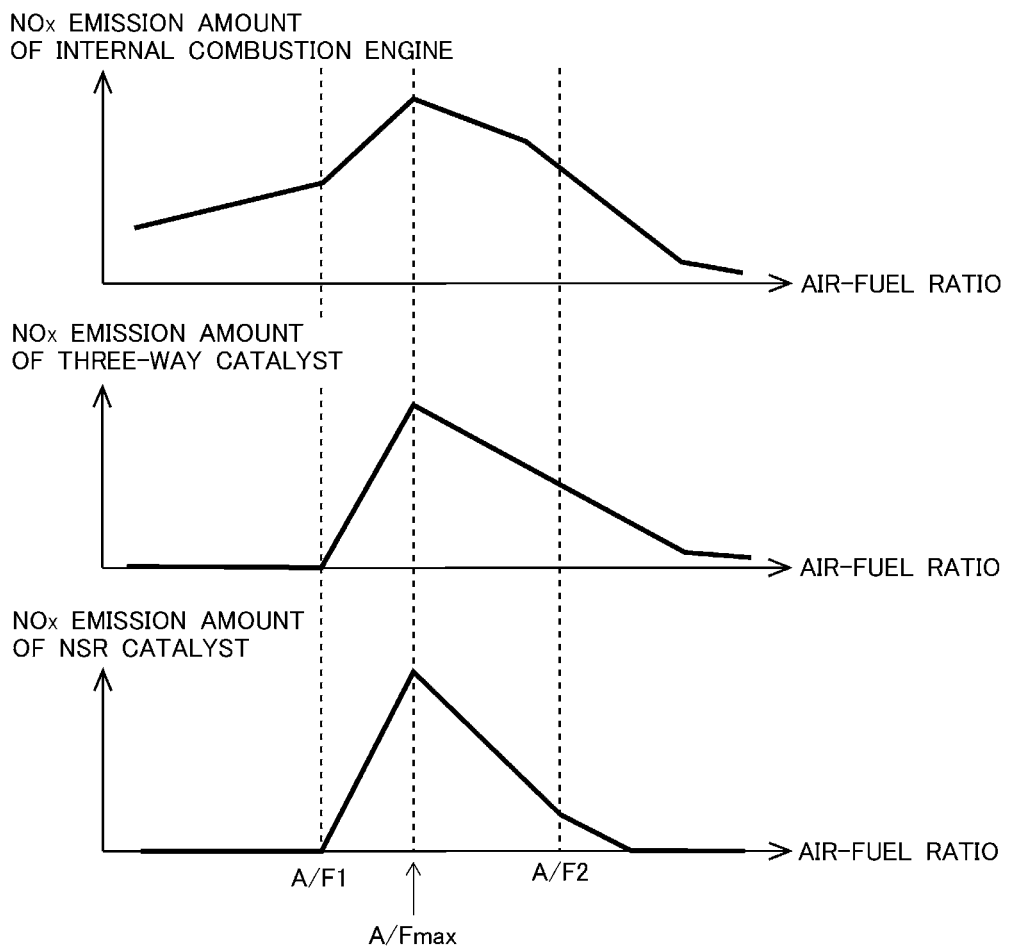

[Fig. 3]
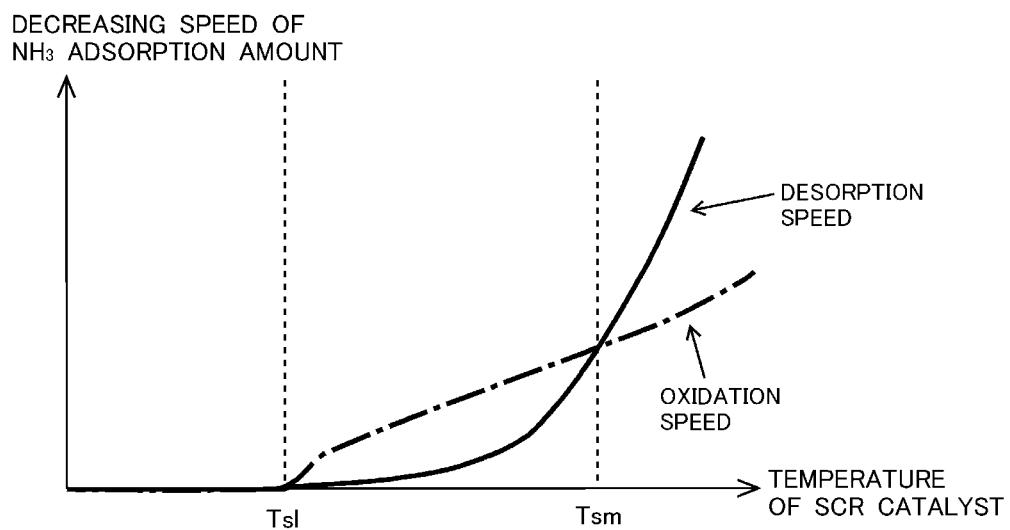

[Fig. 4]
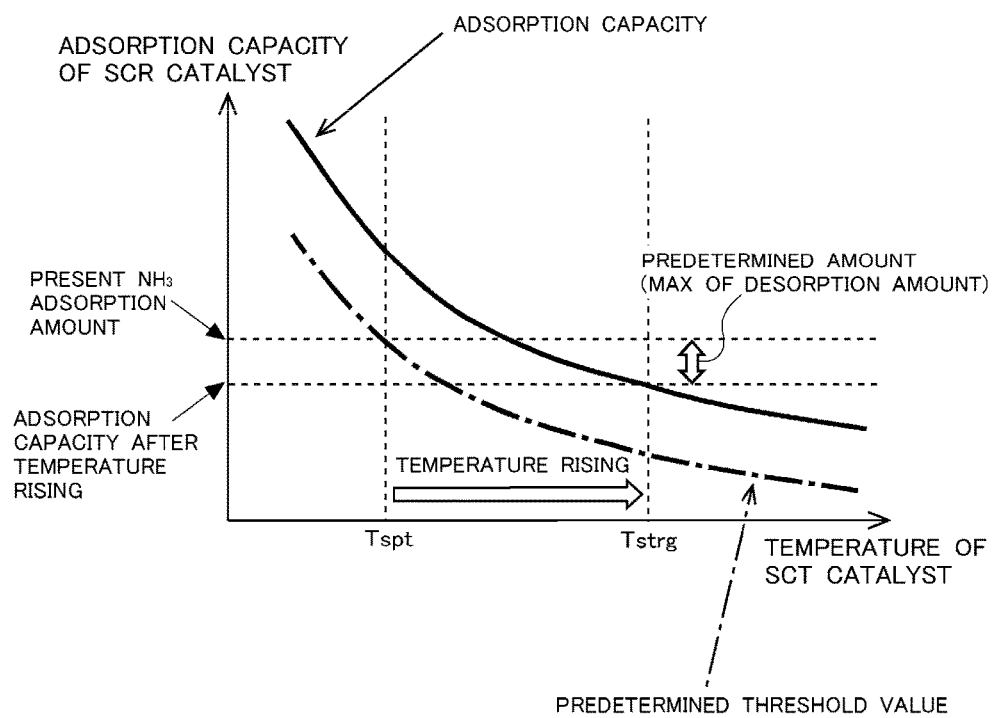

[Fig. 5]
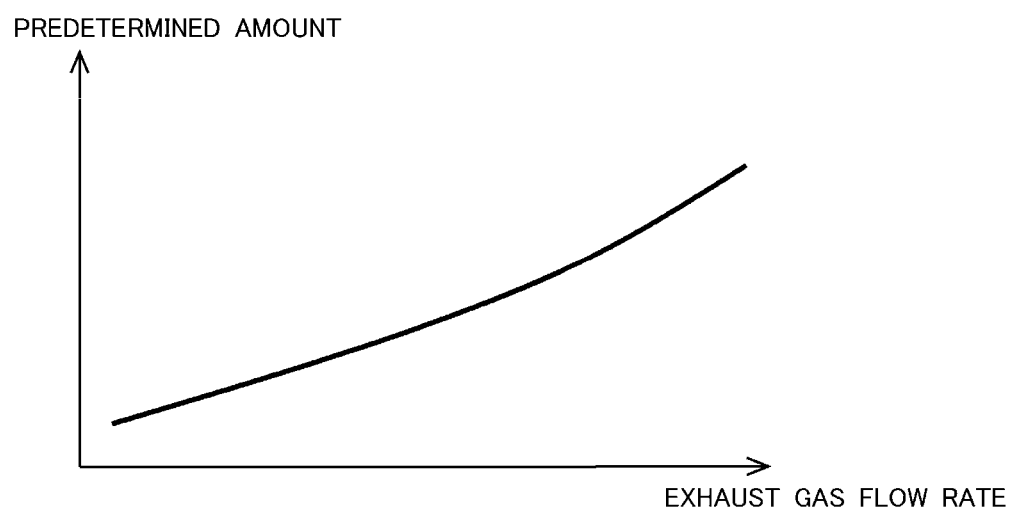

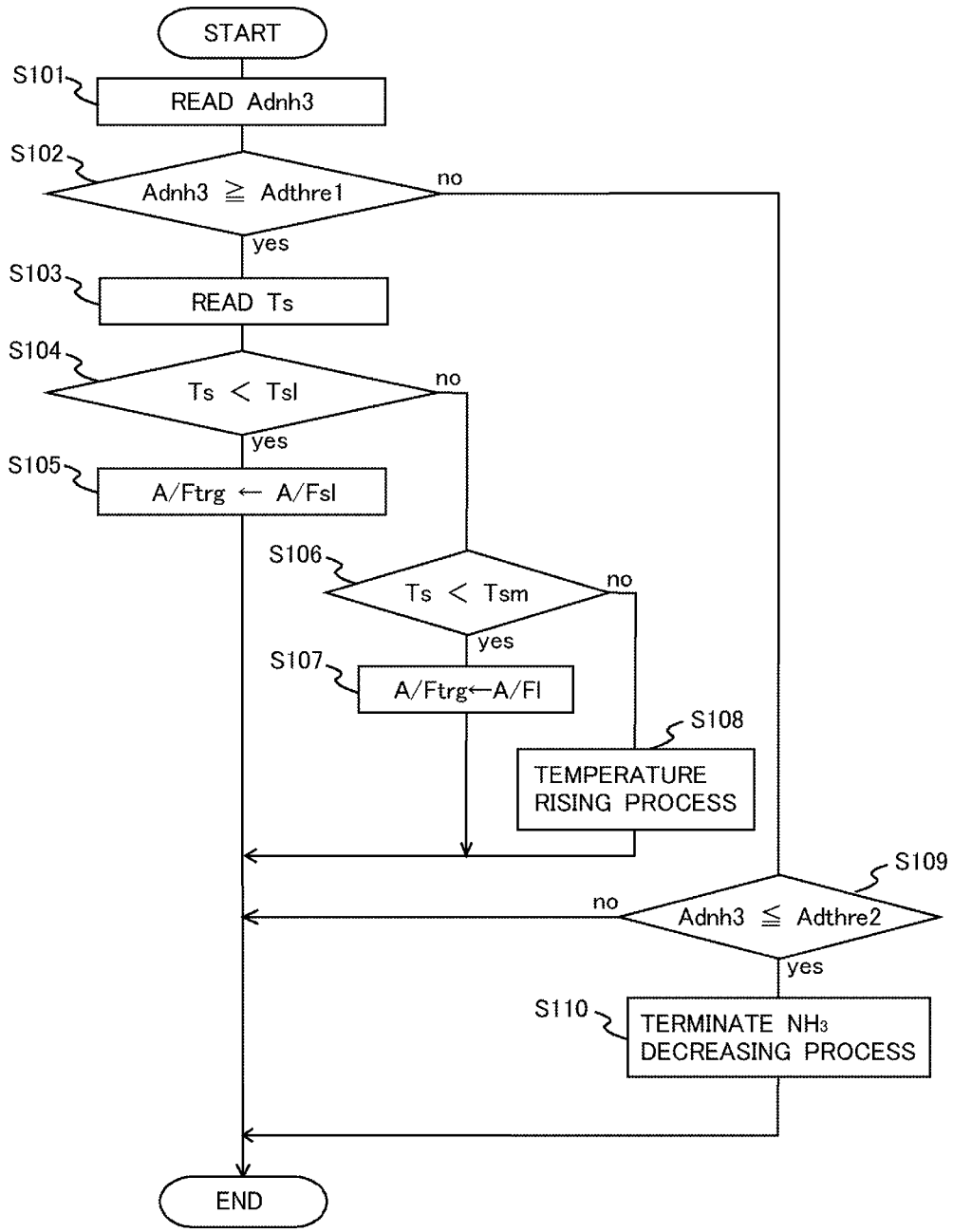
[Fig. 6]

CONTROL APPARATUS FOR INTERNAL COMBUSTION ENGINE

CROSS-REFERENCE TO RELATED APPLICATIONS

This application is a national phase application of International Application No. PCT/JP2016/065459, filed May 25, 2016, and claims the priority of Japanese Application Nos. 2015-110164, filed May 29, 2015, and 2016-100368, filed May 19, 2016, the content of all of which is incorporated herein by reference.

TECHNICAL FIELD

The present invention relates to a control apparatus which is applicable to such an internal combustion engine that a selective catalytic reduction (SCR) catalyst is arranged in an exhaust passage.

BACKGROUND ART

Such a technique is known in relation to an internal combustion engine including a three-way catalyst, a $NO_X$ storage reduction (NSR) catalyst, and an SCR catalyst which are arranged in an exhaust passage that the air-fuel ratio of an air-fuel mixture subjected to the combustion in the internal combustion engine is set to a weak lean air-fuel ratio (slight lean air-fuel ratio) if there is a possibility that $NH_3$, which is adsorbed to the SCR catalyst, may be discharged or emitted into the atmospheric air, and thus $NO_X$ emitted from the internal combustion engine and $NO_X$ desorbed from the NSR catalyst are allowed to arrive at the SCR catalyst so that $NH_3$, which is adsorbed to the SCR catalyst, is consumed (see, for example, Patent Literature 1).

Further, Patent Literature 2 discloses such a technique in relation to an internal combustion engine having an exhaust passage arranged with an SCR catalyst and an injection nozzle for injecting urea or $NH_3$ into the exhaust gas upstream from the SCR catalyst that when the temperature of the SCR catalyst is suddenly raised, then the injection of urea or $NH_3$ from the injection nozzle is stopped, and the amount of $NO_X$ emitted from the internal combustion engine is increased so that $NH_3$ desorbed from the SCR catalyst is thereby reacted with $NO_X$.

CITATION LIST

Patent Literatures

Patent Literature 1: Japanese Patent Application Laid-Open No. 2012-237296
Patent Literature 2: Japanese Patent No. 4542455

SUMMARY OF INVENTION

Technical Problem

In the meantime, according to the technique described in Patent Literature 1 described above, the air-fuel ratio of the air-fuel mixture is controlled to the weak lean air-fuel ratio which is lower than the lean air-fuel ratio that is suitable for the operation condition of the internal combustion engine, if there is a possibility that $NH_3$, which is adsorbed to the SCR catalyst, may be emitted into the atmospheric air. Therefore, there is a possibility that the fuel consumption ratio may be deteriorated.

The present invention has been made taking the foregoing actual circumstances into consideration, an object of which is to provide such a technique in relation to a control apparatus which is applicable to an internal combustion engine having an exhaust passage arranged with an NSR catalyst and an SCR catalyst that the amount of $NH_3$ emitted from the SCR catalyst can be suppressed to be small, while suppressing the deterioration of the fuel consumption ratio so that the deterioration is small.

Solution to Problem

In order to solve the problems as described above, the present invention resides in a control apparatus which is applicable to an internal combustion engine having an exhaust passage arranged with an NSR catalyst and an SCR catalyst, wherein when it is necessary to decrease $NH_3$ adsorbed to the SCR catalyst, then an air-fuel ratio of an air-fuel mixture to be combusted in the internal combustion engine is controlled to a predetermined lean air-fuel ratio which is higher than a theoretical air-fuel ratio if a temperature of the SCR catalyst is not less than a lower limit temperature at which $NH_3$ can be oxidized, while the air-fuel ratio of the air-fuel mixture to be combusted in the internal combustion engine is controlled to a predetermined weak lean air-fuel ratio which is lower than the predetermined lean air-fuel ratio and which is higher than the theoretical air-fuel ratio if the temperature of the SCR catalyst is less than the lower limit temperature.

In particular, according to the present invention, there is provided a control apparatus for an internal combustion engine which is provided with a first exhaust gas purification apparatus that is arranged in an exhaust passage and includes an NSR catalyst; and a second exhaust gas purification apparatus that is arranged in the exhaust passage downstream from the first exhaust gas purification apparatus and includes an SCR catalyst. And, the control apparatus is comprising: an acquirer configured to acquire an $NH_3$ adsorption amount as an amount of $NH_3$ adsorbed to the SCR catalyst; a detector configured to detect a temperature of the SCR catalyst; and a controller configured to operate, when the $NH_3$ adsorption amount acquired by the acquirer is not less than a predetermined threshold value, such that an air-fuel ratio of an air-fuel mixture to be combusted in the internal combustion engine is controlled to a predetermined lean air-fuel ratio which is higher than a theoretical air-fuel ratio if the temperature detected by the detector is not less than a lower limit temperature at which $NH_3$ can be oxidized, while the air-fuel ratio of the air-fuel mixture to be combusted in the internal combustion engine is controlled to a predetermined weak lean air-fuel ratio which is lower than the predetermined lean air-fuel ratio and which increases an amount of $NO_X$ flowing out from the NSR catalyst per unit time as compared with an amount of $NO_X$ stored in the NSR catalyst per unit time if the temperature detected by the detector is less than the lower limit temperature. The term "predetermined threshold value" referred to herein is the $NH_3$ adsorption amount or the amount obtained by subtracting a predetermined margin from the $NH_3$ adsorption amount at which it is assumed that the amount of $NH_3$ desorbed or released from the SCR catalyst and discharged or emitted into the atmospheric air exceeds a permissible amount (for example, a maximum value of the amount at which any stimulative odor is not caused) if the internal combustion engine is operated under an operation condition in which $NH_3$ adsorbed to the SCR catalyst is easily desorbed when the $NH_3$ adsorption amount of the SCR catalyst is not less than the predetermined threshold value. The predetermined threshold value is previously determined by means of an adaptation operation by utilizing, for example, an experiment.

According to the system as described above, the air-fuel ratio of the air-fuel mixture is controlled to the predetermined weak lean air-fuel ratio if the temperature detected by the detector is less than the lower limit temperature when the $NH_3$ adsorption amount acquired by the acquirer is not less than the predetermined threshold value. The predetermined weak lean air-fuel ratio, which is provided at that time, is the air-fuel ratio which is lower than the predetermined lean air-fuel ratio and which increases the amount of $NO_X$ flowing out from the NSR catalyst per unit time as compared with the amount of $NO_X$ stored or occluded in the NSR catalyst per unit time. When the temperature of the SCR catalyst is less than the lower limit temperature, if the air-fuel ratio of the air-fuel mixture is controlled to the predetermined weak lean air-fuel ratio, then a relatively large amount of $NO_X$ flows out from the NSR catalyst. As a result, $NH_3$, which has been adsorbed to the SCR catalyst, is consumed by being reacted with $NO_X$ flowing out from the NSR catalyst.

On the other hand, when the $NH_3$ adsorption amount acquired by the acquirer is not less than the predetermined threshold value, if the temperature detected by the detector is not less than the lower limit temperature, then the air-fuel ratio of the air-fuel mixture is controlled to the predetermined lean air-fuel ratio. The predetermined lean air-fuel ratio, which is provided at that time, may be the highest air-fuel ratio within a range of the air-fuel ratio in which it is possible to secure the drivability and the combustion stability of the internal combustion engine. Alternatively, the predetermined lean air-fuel ratio may be the highest air-fuel ratio within a range in which the exhaust emission other than $NH_3$ does not exceed the regulation value. Note that if the operation state of the internal combustion engine, which is provided when the $NH_3$ adsorption amount acquired by the acquirer is not less than the predetermined threshold value, belongs to the lean operation area (operation area in which the air-fuel ratio of the air-fuel mixture is set to the lean air-fuel ratio), the predetermined lean air-fuel ratio may be equivalent to the air-fuel ratio which is determined depending on the operation state of the internal combustion engine. When the air-fuel ratio of the air-fuel mixture is controlled to the predetermined lean air-fuel ratio, the exhaust gas, which contains a relatively large amount of oxygen, is supplied to the SCR catalyst. When the temperature of the SCR catalyst is not less than the lower limit temperature, if the exhaust gas, which contains the relatively large amount of oxygen, is supplied to the SCR catalyst, then $NH_3$, which has been adsorbed to the SCR catalyst, is reacted with oxygen contained in the exhaust gas, $NH_3$ is converted into $NO_X$, and $NO_X$ converted from $NH_3$ is reduced by being reacted with $NH_3$ adsorbed to the SCR catalyst.

Therefore, according to the control apparatus for the internal combustion engine of the present invention, when the $NH_3$ adsorption amount of the SCR catalyst is not less than the predetermined threshold value, it is possible to decrease the amount of $NH_3$ adsorbed to the SCR catalyst. As a result, the $NH_3$ adsorption amount of the SCR catalyst is suppressed from exceeding the predetermined threshold value, and hence $NH_3$, which is in an amount larger than the permissible amount described above, is also suppressed from being emitted from the SCR catalyst. Further, in the control apparatus for the internal combustion engine of the present invention, when the $NH_3$ adsorption amount is not less than the predetermined threshold value, if the temperature of the SCR catalyst is not less than the lower limit temperature, then the air-fuel ratio of the air-fuel mixture is controlled to the predetermined lean air-fuel ratio which is higher than the predetermined weak lean air-fuel ratio, and thus the $NH_3$ adsorption amount of the SCR catalyst is decreased. Therefore, the opportunities of the decrease in the air-fuel ratio of the air-fuel mixture to the predetermined weak lean air-fuel ratio can be suppressed so that there are few opportunities, as compared with the conventional technique described above. As a result, the amount of $NH_3$ emitted from the SCR catalyst can be suppressed to be small, while suppressing the deterioration of the fuel consumption efficiency so that the deterioration is small.

In this context, the controller may execute a temperature raising process for raising a temperature of the selective catalytic reduction catalyst if the temperature detected by the detector is not less than a predetermined temperature which is higher than the lower limit temperature when the $NH_3$ adsorption amount acquired by the acquirer is not less than the predetermined threshold value.

The SCR catalyst has the following characteristic when the temperature of the SCR catalyst is raised to some extent. That is, the higher the temperature of the SCR catalyst is, the smaller the amount of $NH_3$ capable of being adsorbed by the SCR catalyst is. On this account, when the temperature of the SCR catalyst is not less than the predetermined temperature which is higher than the lower limit temperature, the amount of $NH_3$ desorbed from the SCR catalyst per unit time is increased as compared with the amount of $NH_3$ oxidized per unit time in the SCR catalyst. Accordingly, when the $NH_3$ adsorption amount of the SCR catalyst is not less than the predetermined threshold value, if the temperature of the SCR catalyst is not less than the predetermined temperature, then $NH_3$ may be actively desorbed from the SCR catalyst by raising the temperature of the SCR catalyst. In this procedure, if the amount of temperature rise of the SCR catalyst, which is brought about by the temperature raising process, is excessively increased, there is a possibility that the amount of $NH_3$ desorbed from the SCR catalyst during the execution of the temperature raising process may be excessively increased. If the amount of $NH_3$ desorbed from the SCR catalyst during the execution of the temperature raising process is excessively increased, there is a possibility that $NH_3$, which is emitted into the atmospheric air, may cause the stimulative odor. Therefore, the temperature raising process is performed so that the amount of $NH_3$ desorbed from the SCR catalyst during the execution of the temperature raising process is included in an amount in which any stimulative odor is not caused.

Note that if a method for increasing the fuel injection amount or a method for adding the fuel into the exhaust gas is used as the method for raising the temperature of the SCR catalyst, there is a possibility that the fuel consumption ratio of the internal combustion engine may be deteriorated. Therefore, the temperature raising process may be performed by means of a method for retarding an ignition timing of the internal combustion engine or a method for advancing a valve opening timing of an exhaust valve of the internal combustion engine. In this case, it is possible to decrease the $NH_3$ adsorption amount of the SCR catalyst, while suppressing the deterioration of the fuel consumption ratio so that the deterioration is small. Further, the air-fuel ratio of the air-fuel mixture, which is provided when the temperature raising process is executed, may be set equivalently to the air-fuel ratio which is determined depending on the operation state of the internal combustion engine. Alternatively, the air-fuel ratio of the air-fuel mixture, which is provided when the temperature raising process is executed, may be set equivalently to the predetermined lean air-fuel ratio. When the temperature raising process is executed, if the air-fuel ratio of the air-fuel mixture is set to the predetermined lean air-fuel ratio, then it is possible to decrease the $NH_3$ adsorption amount of the SCR catalyst, while suppressing the deterioration of the fuel consumption ratio so that the deterioration is small.

In this context, the control apparatus for the internal combustion engine described above is also effective when the first exhaust gas purification apparatus includes the NSR catalyst and a three-way catalyst. In the case of the system in which the first exhaust gas purification apparatus includes the NSR catalyst and the three-way catalyst, $NH_3$ is also produced in the three-way catalyst in addition to the NSR catalyst, when the air-fuel ratio of the air-fuel mixture is controlled to the theoretical air-fuel ratio or a rich air-fuel ratio which is lower than the theoretical air-fuel ratio. Therefore, when the first exhaust gas purification apparatus includes the NSR catalyst and the three-way catalyst, the $NH_3$ adsorption amount of the SCR catalyst is not less than the predetermined threshold value in many opportunities, as compared with when the first exhaust gas purification apparatus includes only the NSR catalyst. Therefore, when the control apparatus for the internal combustion engine according to the present invention is applied to the system in which the first exhaust gas purification apparatus includes the NSR catalyst and the three-way catalyst, it is possible to suppress the deterioration of the fuel consumption ratio more effectively so that the deterioration is small when the $NH_3$ adsorption amount of the SCR catalyst is decreased.

Advantageous Effects of Invention

According to the present invention, the amount of $NH_3$ emitted from the SCR catalyst can be suppressed to be small, while suppressing the deterioration of the fuel consumption ratio so that the deterioration is small.

BRIEF DESCRIPTION OF DRAWINGS

FIG. 1 shows a schematic arrangement of an internal combustion engine and an exhaust system thereof to which the present invention is applied.

FIG. 2 shows the correlation among the air-fuel ratio of the air-fuel mixture, the $NO_X$ emission amount of the internal combustion engine, the $NO_X$ emission amount of the three-way catalyst, and the $NO_X$ emission amount of the NSR catalyst.

FIG. 3 shows the correlation between the temperature of the SCR catalyst and the decreasing speed of the $NH_3$ adsorption amount.

FIG. 4 shows a method for determining the target temperature Tstrg in the temperature raising process.

FIG. 5 shows the correlation between the exhaust gas flow rate and the predetermined amount.

FIG. 6 shows a flow chart illustrating a process routine executed by ECU when the $NH_3$ adsorption amount of the SCR catalyst is decreased.

DESCRIPTION OF EMBODIMENTS

An explanation will be made below on the basis of the drawings about a specified embodiment of the present invention. For example, the dimension or size, the material, the shape, and the relative arrangement of each of constitutive parts or components described in the embodiment of the present invention are not intended to limit the technical scope of the invention only thereto unless specifically noted.

FIG. 1 shows a schematic arrangement of an internal combustion engine and an exhaust system thereof to which the present invention is applied. The internal combustion engine 1 shown in FIG. 1 is an internal combustion engine (gasoline engine) of the spark ignition type which can be operated with the air-fuel mixture having an air-fuel ratio (lean air-fuel ratio) higher than the theoretical air-fuel ratio.

The internal combustion engine 1 is provided with a fuel injection valve 2. The fuel injection valve 2 may be a valve device which injects the fuel into an intake passage (for example, an intake port), or the fuel injection valve 2 may be a valve device which injects the fuel into a cylinder. The internal combustion engine 1 is connected to an exhaust pipe 3. The exhaust pipe 3 is a pipe for allowing the gas (exhaust gas) combusted in the cylinder of the internal combustion engine 1 to flow therethrough. A first catalyst casing 4 is arranged at an intermediate position of the exhaust pipe 3. The first catalyst casing 4 accommodates a three-way catalyst composed of a honeycomb structure which is coated with a coat layer such as alumina or the like and a noble metal (for example, platinum, palladium, or rhodium) which is carried on the coat layer.

A second catalyst casing 5 is arranged in the exhaust pipe 3 downstream from the first catalyst casing 4. The second catalyst casing 5 accommodates a $NO_X$ storage reduction catalyst (NSR catalyst) composed of a honeycomb structure which is coated with a coat layer such as alumina or the like, a noble metal (for example, platinum, palladium, or rhodium) which is carried on the coat layer, and a $NO_X$ occluding or storing agent (for example, alkaline metal or alkaline earth metal) which is carried on the coat layer.

A third catalyst casing 6 is arranged in the exhaust pipe 3 downstream from the second catalyst casing 5. The third catalyst casing 6 accommodates a selective catalytic reduction catalyst (SCR catalyst) composed of a honeycomb structure which comprises cordierite and heat resistant steel based on Fe—Cr—Al, a coat layer based on zeolite which coats the honeycomb structure, and a noble metal (for example, platinum or palladium) which is carried on the coat layer.

In this context, the combination of the first catalyst casing 4 and the second catalyst casing 5 corresponds to the "first exhaust gas purification apparatus" according to the present invention. Further, the third catalyst casing 6 corresponds to the "second exhaust gas purification apparatus" according to the present invention.

ECU 7 is provided in combination with the internal combustion engine 1 constructed as described above. ECU 7 is an electronic control unit composed of, for example, CPU, ROM, RAM, and backup RAM. ECU 7 is electrically connected to various sensors including, for example, an air-fuel ratio sensor (A/F sensor) 8, an oxygen concentration sensor ($O_2$ sensor) 9, a first $NO_X$ sensor 10, a second $NO_X$ sensor 11, a temperature sensor 12, an accelerator position sensor 13, a crank position sensor 14, and an air flow meter 15.

The air-fuel ratio sensor 8 is attached to the exhaust pipe 3 upstream from the first catalyst casing 4, and the air-fuel ratio sensor 8 outputs an electric signal which correlates with the air-fuel ratio of the exhaust gas flowing into the first catalyst casing 4. The oxygen concentration sensor 9 is attached to the exhaust pipe 3 between the first catalyst casing 4 and the second catalyst casing 5, and the oxygen concentration sensor 9 outputs an electric signal which correlates with the concentration of oxygen contained in the exhaust gas flowing out from the first catalyst casing 4. The first $NO_X$ sensor 10 is attached to the exhaust pipe 3 between the second catalyst casing 5 and the third catalyst casing 6, and the first $NO_X$ sensor 10 outputs an electric signal which correlates with the concentration of $NO_X$ contained in the exhaust gas flowing out from the second catalyst casing 5 (in other words, the exhaust gas flowing into the third catalyst casing 6). The second $NO_X$ sensor 11 is attached to the exhaust pipe 3 downstream from the third catalyst casing 6, and the second $NO_X$ sensor 11 outputs an electric signal which correlates with the concentration of $NO_X$ contained in the exhaust gas flowing out from the third catalyst casing 6. The accelerator position sensor 13 outputs an electric signal which correlates with the operation amount of an accelerator pedal (accelerator opening degree). The crank position sensor 14 outputs an electric signal which correlates with the rotation position of an output shaft (crank shaft) of the internal combustion engine 1. The air flow meter 15 outputs an electric signal which correlates with the amount of air (intake air amount) sucked into the cylinder of the internal combustion engine 1.

ECU 7 controls the operation state of the internal combustion engine 1 on the basis of the output signals of the various sensors described above. For example, ECU 7 calculates the target air-fuel ratio of the air-fuel mixture on the basis of the engine rotation speed calculated on the basis of the output signal of the crank position sensor 14 and the output signal of the accelerator position sensor 13 (accelerator opening degree). ECU 7 calculates the target fuel injection amount (fuel injection period) of the fuel injection valve 2 on the basis of the target air-fuel ratio and the output signal of the air flow meter 15 (intake air amount), and ECU 7 operates the fuel injection valve 2 in accordance with the target fuel injection amount.

Note that ECU 7 sets the target air-fuel ratio to the lean air-fuel ratio which is higher than the theoretical air-fuel ratio when the operation state of the internal combustion engine 1 belongs to a low rotation-low load area or a moderate rotation-moderate load area (hereinafter referred to as "lean operation area"). ECU 7 sets the target air-fuel ratio to the theoretical air-fuel ratio or the rich air-fuel ratio which is lower than the theoretical air-fuel ratio when the operation state of the internal combustion engine 1 belongs to a high load area or a high rotation area (hereinafter referred to as "rich operation area"). In this way, when the operation state of the internal combustion engine 1 belongs to the lean operation area, if the target air-fuel ratio is set to the lean air-fuel ratio, then it is possible to suppress the fuel consumption amount so that the fuel consumption amount is small. Further, ECU 7 performs, for example, the air-fuel ratio feedback control in which the target fuel injection amount is corrected so that the output signal of the air-fuel ratio sensor 8 coincides with the target air-fuel ratio described above, and the learning control for the correction coefficient used for the air-fuel ratio feedback control on the basis of the output signal of the oxygen concentration sensor 9.

In the meantime, when the target air-fuel ratio is set to the lean air-fuel ratio, the $NO_X$ purification performance of the three-way catalyst accommodated in the first catalyst casing 4 is lowered. On this account, when the target air-fuel ratio is set to the lean air-fuel ratio, it is necessary to purify $NO_X$ contained in the exhaust gas by means of the NSR catalyst of the second catalyst casing 5 and the SCR catalyst of the third catalyst casing 6.

When the oxygen concentration of the exhaust gas flowing into the second catalyst casing 5 is high (when the air-fuel ratio of the exhaust gas is lean), the NSR catalyst stores (occludes) or adsorbs $NO_X$ contained in the exhaust gas. When the oxygen concentration of the exhaust gas flowing into the second catalyst casing 5 is low, and the reducing component such as hydrocarbon (HC), carbon monoxide (CO) or the like is contained in the exhaust gas (when the air-fuel ratio of the exhaust gas is rich), then the NSR catalyst releases $NO_X$ occluded by the NSR catalyst, and released $NO_X$ is reduced into nitrogen ($N_2$).

Accordingly, ECU 7 executes the rich spike process when the $NO_X$ occlusion amount (storage amount) of the NSR catalyst is not less than a certain amount in the lean operation area. The rich spike process is such a process that the fuel injection amount and/or the intake air amount is/are adjusted so that the oxygen concentration in the exhaust gas is low and the concentrations of HC and CO are raised. More specifically, the rich spike process is such a process that at least one of the process for increasing the fuel injection amount of the fuel injection valve 2 and the process for decreasing the opening degree of the intake throttle valve (throttle valve) is executed. Note that when the fuel injection valve 2 is arranged so that the fuel is directly injected into the cylinder, the rich spike process may be executed by means of a method in which the fuel is injected from the fuel injection valve 2 during the exhaust stroke of the cylinder. Further, the rich spike process may be executed if the operation time after the termination of the previous rich spike process (preferably the operation time in which the target air-fuel ratio is set to the lean air-fuel ratio) is not less than a certain time, or the rich spike process may be executed if the travel distance after the termination of the previous rich spike process (preferably the travel distance in which the target air-fuel ratio is set to the lean air-fuel ratio) is not less than a certain distance.

The SCR catalyst adsorbs ammonia ($NH_3$) contained in the exhaust gas. The SCR catalyst reduces $NO_X$ into nitrogen ($N_2$) by reacting $NH_3$ adsorbed to the SCR catalyst with $NO_X$ contained in the exhaust gas. Note that $NH_3$, which is supplied to the SCR catalyst, is produced by the three-way catalyst and/or the NSR catalyst. For example, when the rich spike process is executed, a part of $NO_X$ is reduced into $NH_3$ by the three-way catalyst. A part of $NO_X$, which flows out from the NSR catalyst, is reduced into $NH_3$ by the NSR catalyst. In this procedure, the amount of $NH_3$, which is produced by the NSR catalyst, changes depending on, for example, the interval at which the rich spike process is executed and the air-fuel ratio which is provided when the rich spike process is executed. Therefore, when $NH_3$ is supplied to the SCR catalyst, then the execution interval of the rich spike process may be set to an interval which is suitable for the production of $NH_3$, or the air-fuel ratio, which is provided during the execution of the rich spike process, may be set to an air-fuel ratio (for example, about 14.1) which is suitable for the production of $NH_3$.

In the meantime, when the operation state of the internal combustion engine 1 belongs to the rich operation area, the target air-fuel ratio of the air-fuel mixture is set to the theoretical air-fuel ratio or the rich air-fuel ratio. Therefore, $NO_X$, which is contained in the exhaust gas, is purified by the three-way catalyst of the first catalyst casing 4. Therefore, the amount of $NO_X$, which arrives at the SCR catalyst of the third catalyst casing 6, is zero or extremely small, and hence $NH_3$, which is adsorbed to the SCR catalyst, is scarcely consumed. Further, when the target air-fuel ratio of the air-fuel mixture is set to the theoretical air-fuel ratio or the rich air-fuel ratio, $NH_3$ is produced by the three-way catalyst of the first catalyst casing 4 and the NSR catalyst of the second catalyst casing 5. Therefore, the amount of $NH_3$, which is adsorbed to the SCR catalyst of the third catalyst casing 6, is increased. Therefore, if the operation state of the internal combustion engine 1 belongs to the rich operation area in many opportunities, there is a possibility that the ability of the SCR catalyst to adsorb $NH_3$ may be saturated. If the ability of the SCR catalyst to adsorb $NH_3$ is saturated, there is a possibility that a relatively large amount of $NH_3$ may be emitted into the atmospheric air, and the odor may be caused.

In view of the above, in this embodiment, if the $NH_3$ adsorption amount of the SCR catalyst is not less than a predetermined threshold value, a process (hereinafter referred to as "$NH_3$ decreasing process"), in which the $NH_3$ adsorption amount of the SCR catalyst is decreased, is executed. Note that the term "predetermined threshold value" referred to herein is the amount obtained by subtracting a predetermined margin from the $NH_3$ adsorption amount at which it is assumed that the amount of $NH_3$ desorbed or released from the SCR catalyst and emitted or discharged into the atmospheric air exceeds a permissible amount (for example, a maximum value of the amount at which any stimulative odor is not caused) if the internal combustion engine 1 is operated under an operation condition in which $NH_3$ adsorbed to the SCR catalyst is easily desorbed when the $NH_3$ adsorption amount of the SCR catalyst is not less than the predetermined threshold value. The predetermined threshold value is previously determined by means of an adaptation operation by utilizing, for example, an experiment. Note that the "operation condition in which $NH_3$ adsorbed to the SCR catalyst is easily desorbed" referred to herein is such an operation condition that the flow rate of the exhaust gas is apt to be suddenly increased and the temperature of the exhaust gas is apt to be suddenly raised, for example, as in the acceleration operation.

A method for executing the $NH_3$ decreasing process according to this embodiment will be described below. At first, when the $NH_3$ decreasing process is executed, ECU 7 acquires the $NH_3$ adsorption amount of the SCR catalyst. The $NH_3$ adsorption amount of the SCR catalyst is determined by adding up values each of which is obtained by subtracting the $NH_3$ consumption amount (amount of $NH_3$ which contributes to the reduction of $NO_X$) and the $NH_3$ slip amount (amount of $NH_3$ which passes through the SCR catalyst) from the amount of $NH_3$ which is supplied to the SCR catalyst of the third catalyst casing 6.

In this procedure, the amount of $NH_3$, which is supplied to the SCR catalyst, is the total amount of the amount of $NH_3$ which is produced by the three-way catalyst of the first catalyst casing 4 and the amount of $NH_3$ which is produced by the NSR catalyst of the second catalyst casing 5. The amount of $NH_3$, which is produced by the three-way catalyst, correlates with the air-fuel ratio of the exhaust gas, the flow rate of the exhaust gas, and the temperature of the three-way catalyst. Therefore, if the correlation thereamong is previously determined, it is possible to determine the amount of $NH_3$ which is produced by the three-way catalyst by using the arguments of the air-fuel ratio of the exhaust gas, the flow rate of the exhaust gas, and the temperature of the three-way catalyst. On the other hand, the amount of $NH_3$, which is produced by the NSR catalyst, correlates with the air-fuel ratio of the exhaust gas, the flow rate of the exhaust gas, and the temperature of the NSR catalyst. Therefore, if the correlation thereamong is previously determined, it is possible to determine the amount of $NH_3$ which is produced by the NSR catalyst by using the arguments of the air-fuel ratio of the exhaust gas, the flow rate of the exhaust gas, and the temperature of the NSR catalyst.

The $NH_3$ consumption amount is calculated by using the parameters of the amount of $NO_X$ flowing into the SCR catalyst ($NO_X$ inflow amount) and the $NO_X$ purification rate of the SCR catalyst. In this procedure, the $NO_X$ inflow amount is calculated by multiplying the measured value of the first $NO_X$ sensor 10 ($NO_X$ concentration of the exhaust gas flowing into the third catalyst casing 6) and the flow rate of the exhaust gas (total amount of the measured value of the air flow meter 15 and the fuel injection amount). On the other hand, the $NO_X$ purification rate of the SCR catalyst is calculated by using the parameters of the flow rate of the exhaust gas and the temperature of the SCR catalyst. Note that the correlation among the $NO_X$ purification rate of the SCR catalyst, the flow rate of the exhaust gas, and the temperature of the SCR catalyst is previously determined experimentally.

The $NH_3$ slip amount is determined by using the parameters of the previous calculated value of the $NH_3$ adsorption amount, the temperature of the SCR catalyst, and the flow rate of the exhaust gas. In this procedure, if the flow rate of the exhaust gas is constant, the following relationship holds. That is, the larger the $NH_3$ adsorption amount is and/or the higher the temperature of the SCR catalyst is, the higher the concentration of $NH_3$ of the exhaust gas flowing out from the SCR catalyst is. Further, if the $NH_3$ concentration of the exhaust gas flowing out from the SCR catalyst is constant, the following relationship holds. That is, the larger the flow rate of the exhaust gas is, the larger the $NH_3$ slip amount per unit time is. Based on the correlations as described above, the $NH_3$ slip amount can be determined by determining the $NH_3$ concentration of the exhaust gas flowing out from the SCR catalyst by using the parameters of the previous calculated value of the $NH_3$ adsorption amount and the temperature of the SCR catalyst, and then multiplying the $NH_3$ concentration by the flow rate of the exhaust gas.

If the $NH_3$ adsorption amount determined by the method described above arrives at the value of not less than the predetermined threshold value, ECU 7 executes the $NH_3$ decreasing process. At first, if the temperature of the SCR catalyst is less than the lower limit temperature at which $NH_3$ can be oxidized, ECU 7 sets the target air-fuel ratio of the air-fuel mixture to the predetermined weak lean air-fuel ratio which is higher than the theoretical air-fuel ratio. The "weak lean air-fuel ratio" referred to herein is such an air-fuel ratio that the amount of $NO_X$ purified by the three-way catalyst per unit time is smaller than the amount of $NO_X$ flowing into the three-way catalyst per unit time (the amount of $NO_X$ flowing out from the three-way catalyst is larger than zero), and the amount of $NO_X$ flowing out from the NSR catalyst per unit time is larger than the amount of $NO_X$ stored or occluded by the NSR catalyst per unit time at the air-fuel ratio. Preferably, as shown in FIG. 2, the predetermined weak lean air-fuel ratio is such an air-fuel ratio that the amount of $NO_X$ purified by the three-way catalyst per unit time is smaller than the amount of $NO_X$ flowing into the three-way catalyst per unit time, and the amount of $NO_X$ flowing out from the NSR catalyst is maximized at the air-fuel ratio (A/Fmax shown in FIG. 2) within a range of the air-fuel ratio (range of A/F1 to A/F2 shown in FIG. 2) in which the amount of $NO_X$ flowing out from the NSR catalyst per unit time is larger than the amount of $NO_X$ stored or occluded by the NSR catalyst per unit time. When the air-fuel ratio A/Fmax as described above is decided as the predetermined weak lean air-fuel ratio, even if the $NH_3$ decreasing process is executed in a state in which the $NO_X$ storage amount (occlusion amount) of the NSR catalyst is relatively small, then a relatively large amount of $NO_X$ can be supplied to the SCR catalyst of the third catalyst casing 6. When the temperature of the SCR catalyst is less than the lower limit temperature, if the relatively large amount of $NO_X$ is supplied to the SCR catalyst, then the amount of $NH_3$, which is consumed for the reduction of $NO_X$ in the SCR catalyst, is increased. As a result, it is possible to effectively decrease the $NH_3$ adsorption amount of the SCR catalyst. In the meantime, when only the second catalyst casing 5 is arranged upstream from the third catalyst casing 6, the predetermined weak lean air-fuel ratio may be set to such an air-fuel ratio that the amount of $NO_X$ flowing out from the NSR catalyst is maximized within a range of the air-fuel ratio in which the amount of $NO_X$ flowing out from the NSR catalyst per unit time is larger than the amount of $NO_X$ stored or occluded by the NSR catalyst per unit time. Further, when only the first catalyst casing 4 is arranged upstream from the third catalyst casing 6, the predetermined weak lean air-fuel ratio may be set to such an air-fuel ratio that the amount of $NO_X$ flowing out from the three-way catalyst is maximized within a range of the air fuel ratio in which the amount of $NO_X$ purified by the three-way catalyst per unit time is smaller than the amount of $NO_X$ flowing into the three-way catalyst per unit time.

In the next place, when the $NH_3$ adsorption amount is not less than the predetermined threshold value, if the temperature of the SCR catalyst is not less than the lower limit temperature, then ECU 7 sets the target air-fuel ratio of the air-fuel mixture to the predetermined lean air-fuel ratio which is higher than the predetermined weak lean air fuel ratio. The "predetermined lean air-fuel ratio" referred to herein may be the highest air-fuel ratio within a range of the air-fuel ratio in which it is possible to secure the combustion stability of the internal combustion engine 1 and the drivability, or the "predetermined lean air-fuel ratio" may be the highest air fuel ratio within a range in which the exhaust emission other than $NH_3$ does not exceed the regulation value. Note that if the operation state of the internal combustion engine 1, which is provided when the $NH_3$ decreasing process is executed, belongs to the lean operation area, the predetermined lean air-fuel ratio may be set equivalently to the air-fuel ratio which is determined depending on the operation state of the internal combustion engine 1. When the target air-fuel ratio of the air-fuel mixture is set to the predetermined lean air-fuel ratio, the exhaust gas, which has a high oxygen concentration, flows into the SCR catalyst. When the temperature of the SCR catalyst is not less than the lower limit temperature, if the exhaust gas, which has the high oxygen concentration, is supplied to the SCR catalyst, then the oxidation of $NH_3$ adsorbed to the SCR catalyst is facilitated. In this procedure, when $NH_3$, which is adsorbed to the SCR catalyst, is oxidized, $NO_X$ is produced. $NO_X$, which is produced as described above, is reacted with $NH_3$ adsorbed to the SCR catalyst, and $NO_X$ is reduced. Therefore, if the oxidation of $NH_3$ adsorbed to the SCR catalyst is facilitated by setting the air-fuel ratio of the air-fuel mixture to the predetermined lean air-fuel ratio when the temperature of the SCR catalyst is not less than the lower limit temperature, then it is possible to effectively decrease the $NH_3$ adsorption amount of the SCR catalyst.

In the meantime, there is such a tendency that the amount of $NH_3$ capable of being adsorbed by the SCR catalyst (adsorption capacity) is more decreased as the temperature of the SCR catalyst is more raised. On this account, as shown in FIG. 3, if the temperature of the SCR catalyst is not less than a predetermined temperature (Tsm shown in FIG. 3) which is higher than the lower limit temperature (Tsl shown in FIG. 3), the amount of $NH_3$ desorbed from the SCR catalyst per unit time (desorption speed) is larger than the amount of $NH_3$ oxidized per unit time by the SCR catalyst (oxidation speed). Accordingly, ECU 7 executes the process for raising the temperature of the SCR catalyst (temperature raising process) if the temperature of the SCR catalyst is not less than the predetermined temperature Tsm which is higher than the lower limit temperature Tsl.

If the temperature raising process is executed when the temperature of the SCR catalyst is not less than the predetermined temperature Tsm, then the amount of $NH_3$ desorbed from the SCR catalyst per unit time is increased, and hence it is possible to decrease the $NH_3$ adsorption amount of the SCR catalyst. In the meantime, if the temperature of the SCR catalyst is raised by the temperature raising process, the adsorption capacity of the SCR catalyst is decreased in accordance therewith. On this account, there is a possibility that the adsorption capacity, which is provided after raising the temperature of the SCR catalyst by the temperature raising process, may be smaller than the $NH_3$ adsorption amount (present $NH_3$ adsorption amount) provided before the execution of the temperature raising process. In this procedure, if the difference is excessively increased between the present $NH_3$ adsorption amount and the adsorption capacity provided after raising the temperature of the SCR catalyst by the temperature raising process, there is a possibility that the amount of $NH_3$ desorbed from the SCR catalyst during the execution of the temperature raising process may be excessively increased. Then, if the amount of $NH_3$, which is desorbed from the SCR catalyst during the execution of the temperature raising process, is excessively increased, there is a possibility that that $NH_3$ emitted into the atmospheric air may cause the stimulative odor. On this account, the temperature raising process is performed so that the amount of $NH_3$ desorbed from the SCR catalyst during the execution of the temperature raising process is included in the amount (equal to or not more than the permissible amount described above) which does not cause the stimulative order. Specifically, as shown in FIG. 4, ECU 7 subtracts a predetermined amount from the present $NH_3$ adsorption amount of the SCR catalyst, and ECU 7 calculates the target value of the adsorption amount of the SCR catalyst after the execution of the temperature raising process (target capacity as shown in FIG. 4). The "predetermined amount" referred to herein is the amount obtained by subtracting a predetermined margin from the permissible amount. Note that the predetermined amount may be a fixed value. Alternatively, the predetermined amount may be a variable value which is changed depending on the exhaust gas flow rate. For example, the order of $NH_3$, which is caused when the exhaust gas is emitted into the atmospheric air, is more intensified as the concentration of $NH_3$ contained in the exhaust gas is more raised. On this account, as shown in FIG. 5, the predetermined amount may be set to a smaller value as the exhaust gas flow rate is more decreased. In the next place, ECU 7 determines the temperature of the SCR catalyst (Tstrg shown in FIG. 4) at which the adsorption capacity of the SCR catalyst is equal to the target capacity described above, and ECU 7 sets the temperature Tstrg as the target temperature of the SCR catalyst in the temperature raising process. In this procedure, the correlation between the adsorption capacity of the SCR catalyst and the temperature of the SCR catalyst as shown in FIG. 4 is previously determined experimentally. In the next place, ECU 7 may calculate the amount of retard of the ignition timing and the amount of advance of the valve opening timing of the exhaust valve on the basis of the difference between the present temperature of the SCR catalyst (Tspt shown in FIG. 4) and the target temperature Tstrg. Note that the amount of retard of the ignition timing and the amount of advance of the valve opening timing the exhaust valve may be previously determined fixed values. In this case, ECU 7 may terminate the temperature raising process at the point in time at which the temperature of the SCR catalyst arrives at the target temperature Tstrg. When the temperature raising process is executed in accordance with the method as described above, it is possible to decrease the $NH_3$ adsorption amount of the SCR catalyst without causing the stimulative odor.

Note that the target air-fuel ratio of the air-fuel mixture, which is provided when the temperature raising process is executed, may be set to the air-fuel ratio which is determined depending on the operation state of the internal combustion engine 1. Alternatively, the target air-fuel ratio may be set to the predetermined lean air-fuel ratio. When the temperature raising process is executed, if the target air-fuel ratio of the air-fuel mixture is set to the predetermined lean air-fuel ratio, then the desorption of $NH_3$ adsorbed to the SCR catalyst is facilitated, and the oxidation of $NH_3$ adsorbed to the SCR catalyst or $NH_3$ desorbed from the SCR catalyst is facilitated. As a result, it is possible to quickly decrease the $NH_3$ adsorption amount of the SCR catalyst, while suppressing the amount of $NH_3$ emitted into the atmospheric air to be not more than the permissible amount. Further, if the air-fuel ratio of the air-fuel mixture is set to the predetermined lean air-fuel ratio during the execution of the temperature raising process, it is also possible to suppress the deterioration of the fuel consumption ratio so that the deterioration is small.

In the meantime, if a method for increasing the fuel injection amount or a method for adding the fuel into the exhaust gas is used as the method for raising the temperature of the SCR catalyst, there is a possibility that the fuel consumption ratio of the internal combustion engine 1 may be deteriorated. On this account, it is desirable that the temperature raising process is performed by means of a method for retarding the ignition timing of the internal combustion engine 1 or a method for advancing the valve opening timing of the exhaust valve of the internal combustion engine 1. If the temperature raising process is performed in accordance with the method as described above, it is possible to suppress the deterioration of the fuel consumption ratio which would be otherwise caused by the execution of the temperature raising process, so that the deterioration is small.

An explanation will now be made with reference to FIG. 6 about a procedure for executing the $NH_3$ decreasing process in this embodiment. FIG. 6 shows a flow chart illustrating a process routine executed by ECU 7 when the $NH_3$ adsorption amount of the SCR catalyst is decreased. This process routine is previously stored in ROM of ECU 7, and the process routine is periodically executed by ECU 7.

In the process routine shown in FIG. 6, ECU 7 firstly reads the $NH_3$ adsorption amount Adnh3 of the SCR catalyst in a process of S101. As described above, the $NH_3$ adsorption amount Adnh3 of the SCR catalyst can be determined by adding up values each of which is obtained by subtracting the $NH_3$ consumption amount and the $NH_3$ slip amount from the total amount of $NH_3$ produced by the three-way catalyst and the NSR catalyst. The "acquirer" according to the present invention is realized by determining the $NH_3$ adsorption amount of the SCR catalyst by means of the method as described above.

In a process of S102, ECU 7 judges whether or not the $NH_3$ adsorption amount Adnh3, which is read in the process of S101 described above, is not less than the predetermined threshold value Adthre1. As described above, the predetermined threshold value Adthre1 is the amount which obtained by subtracting the predetermined margin from the $NH_3$ adsorption amount at which it is assumed that the amount of $NH_3$ desorbed from the SCR catalyst and emitted into the atmospheric air exceeds the permissible amount if the internal combustion engine 1 is operated under the operation condition in which $NH_3$ adsorbed to the SCR catalyst is easily desorbed when the $NH_3$ adsorption amount of the SCR catalyst is not less than the predetermined threshold value Adthre1. If the affirmative judgment is made in the process of S102 (Adnh3≥Adthre1) in the process of S102, then it can be regarded that $NH_3$ in an amount of not less than the permissible amount may be possibly desorbed from the SCR catalyst, if the internal combustion engine 1 is operated under the operation condition in which $NH_3$ adsorbed to the SCR catalyst is easily desorbed. Therefore, ECU 7 executes the $NH_3$ decreasing process in a process of S103 and the followings.

At first, ECU 7 reads the temperature Ts of the SCR catalyst in the process of S103. Specifically, ECU 7 reads the measured value of the temperature sensor 12 as the temperature Ts of the SCR catalyst. Note that when a temperature sensor is also attached to the exhaust pipe 3 between the second catalyst casing 5 and the third catalyst casing 6, the temperature Ts of the SCR catalyst may be calculated from the difference between the measured value of the temperature sensor and the measured value of the temperature sensor 12. The "detector" according to the present invention is realized by determining the temperature Ts of the SCR catalyst in accordance with the methods as described above.

In a process of S104, ECU 7 judges whether or not the temperature Ts, which is read in the process of S103, is less than the lower limit temperature Tsl. As described above, the lower limit temperature Ts1 is the lower limit value of the temperature at which $NH_3$ can be oxidized. If the affirmative judgment is made in the process of S104 (Ts<Tsl), ECU 7 proceeds to a process of S105.

In the process of S105, ECU 7 sets the target air-fuel ratio A/Ftrg of the air-fuel mixture to the predetermined weak lean air-fuel ratio A/Fsl. As described in the foregoing explanation about FIG. 2, the predetermined weak lean air-fuel ratio A/Fsl is such an air-fuel ratio that the amount of $NO_X$ flowing out from the three-way catalyst is larger than zero, and the amount of $NO_X$ flowing out from the NSR catalyst is maximized at the air-fuel ratio (A/Fmax shown in FIG. 2) within a range of the air-fuel ratio in which the amount of $NO_X$ flowing out from the NSR catalyst per unit time is larger than the amount of $NO_X$ stored or occluded by the NSR catalyst per unit time. If the target air-fuel ratio A/Ftrg of the air-fuel mixture is set to the predetermined weak lean air-fuel ratio A/Fsl as described above, the exhaust gas flowing out from the NSR catalyst contains a relatively large amount of $NO_X$. If the exhaust gas containing the relatively large amount of $NO_X$ flows into the SCR catalyst, the amount of $NH_3$, which contributes to the reduction of $NO_X$ in the SCR catalyst, is increased. As a result, it is possible to effectively decrease the $NH_3$ adsorption amount Adnh3 of the SCR catalyst. If the process of S105 is completely executed, ECU 7 once terminates the execution of this process routine.

Further, if the negative judgment is made in the process of S104 described above (Ts≥Tsl), then ECU 7 proceeds to a process of S106 to judge whether or not the temperature Ts read in the process of S103 is less than the predetermined temperature Tsm. That is, ECU 7 judges whether or not the temperature Ts of the SCR catalyst belong to the temperature range which is not less than the lower limit temperature Tsl and which is less than the predetermined temperature Tsm. As described above, the predetermined temperature Tsm is the minimum value of the temperature at which the amount of $NH_3$ desorbed from the SCR catalyst per unit time is larger than the amount of $NH_3$ oxidized per unit time by the SCR catalyst. If the affirmative judgment is made in the process of S106 (Ts<Tsm), ECU 7 proceeds to a process of S107.

In the process of S107, ECU 7 sets the target air-fuel ratio A/Ftrg of the air-fuel mixture to the predetermined lean air-fuel ratio A/Fl. As described above, the predetermined lean air-fuel ratio A/Fl is the air-fuel ratio which is higher than the predetermined weak lean air-fuel ratio A/Fsl, and the predetermined lean air-fuel ratio A/Fl is the highest air-fuel ratio within a range of the air-fuel ratio in which it is possible to secure the combustion stability of the internal combustion engine 1 and the drivability (or the highest air-fuel ratio within a range in which the exhaust emission other than $NH_3$ does not exceed the regulation value). Note that if the operation state of the internal combustion engine 1 at the present point in time belongs to the lean operation area described above, the predetermined lean air-fuel ratio A/Fl may be an air-fuel ratio which is determined depending on the operation state of the internal combustion engine. If the target air-fuel ratio A/Ftrg of the air-fuel mixture is set to the predetermined lean air-fuel ratio A/Fl as described above, the exhaust gas, which contains a relatively large amount of oxygen, is supplied to the SCR catalyst. In this case, $NH_3$, which is adsorbed to the SCR catalyst, is reacted with oxygen to produce $NO_X$, and $NO_X$ is reacted with $NH_3$ which is adsorbed to the SCR catalyst. As a result, it is possible to effectively decrease the $NH_3$ adsorption amount Adnh3 of the SCR catalyst. If the process of S107 is completely executed, ECU 7 once terminates the execution of this process routine.

Further, if the negative judgment is made in the process of S106 described above (Ts≥Tsm), ECU 7 proceeds to a process of S108. In the process of S108, ECU 7 executes the temperature raising process. Specifically, ECU 7 facilitates the temperature rising of the SCR catalyst by executing the process for retarding the ignition timing of the internal combustion engine 1 or the process for advancing the valve opening timing of the exhaust valve of the internal combustion engine 1. In this procedure, as described in the foregoing explanation about FIG. 4, ECU 7 calculates the target temperature Tstrg of the SCR catalyst so that the amount of $NH_3$ desorbed from the SCR catalyst during the execution of the temperature raising process is included in the range of not more than the predetermined amount. Then, ECU 7 executes the temperature raising process so that the temperature Ts of the SCR catalyst is raised to the target temperature Tstrg. When the temperature raising process is executed as described above, it is possible to decrease the $NH_3$ adsorption amount of the SCR catalyst without causing the stimulative odor. Note that ECU 7 may set the target air-fuel ratio of the air-fuel mixture to the predetermined lean air-fuel ratio when the temperature raising process is executed. When the target air-fuel ratio of the air-fuel mixture during the execution of the temperature raising process is set to the predetermined lean air-fuel ratio, then it is possible to facilitate the desorption of $NH_3$ adsorbed to the SCR catalyst, and it is also possible to facilitate the oxidation of $NH_3$ adsorbed to the SCR catalyst and $NH_3$ desorbed from the SCR catalyst. Therefore, even when the internal combustion engine 1 is operated under the operation condition in which $NH_3$ adsorbed to the SCR catalyst is easily desorbed after the execution of the temperature raising process, the amount of $NH_3$ emitted into the atmospheric air can be more reliably suppressed to be not more than the permissible amount. Further, it is also possible to suppress the deterioration of the fuel consumption ratio so that the deterioration is small. If the process of S108 is completely executed, ECU 7 once terminates the execution of this process routine.

Further, if the negative judgment is made in the process of S102 described above (Adnh3<Adthre1), it is possible to regard that $NH_3$ in an amount of not less than the permissible amount is not desorbed from the SCR catalyst, even when the internal combustion engine 1 is operated under the operation condition in which $NH_3$ adsorbed to the SCR catalyst is easily desorbed. On this account, ECU 7 proceeds to a process of S109 to judge whether or not the $NH_3$ adsorption amount Adnh3 of the SCR catalyst read in the process of S101 is not more than a predetermined termination judgment value Adthre2 which is smaller than the predetermined threshold value Adthre1. If the negative judgment is made in the process of S109 (Adnh3>Adthre2), ECU 7 once terminates the execution of this process routine. In this procedure, if the $NH_3$ decreasing process is being executed, the $NH_3$ decreasing process is continuously executed. On the other hand, if the affirmative judgment is made in the process of S109 (Adnh3≤Adthre2), ECU 7 proceeds to a process of S110.

When the process of S110 is executed, if the $NH_3$ decreasing process is being executed, then ECU 7 terminates the $NH_3$ decreasing process by restoring the target air-fuel ratio A/Ftrg of the air-fuel mixture to the air-fuel ratio which corresponds to the operation state of the internal combustion engine 1. Further, when the process of S110 is executed, if the $NH_3$ decreasing process is not executed, then ECU 7 continues the state in which the $NH_3$ decreasing process is not executed.

ECU 7 executes the process routine shown in FIG. 6 as described above, and thus the "controller" according to the present invention is realized. Therefore, it is possible to decrease the $NH_3$ adsorption amount of the SCR catalyst when the $NH_3$ adsorption amount of the SCR catalyst is not less than the predetermined threshold value. As a result, the $NH_3$ adsorption amount of the SCR catalyst is suppressed from exceeding the predetermined threshold value. Therefore, the amount of $NH_3$ emitted from the SCR catalyst can be suppressed to be not more than the permissible amount. Further, when the $NH_3$ adsorption amount of the SCR catalyst is not less than the predetermined threshold value, if the temperature of the SCR catalyst is not less than the lower limit temperature, then the $NH_3$ adsorption amount of the SCR catalyst is decreased by allowing the air-fuel ratio of the air-fuel mixture to be the predetermined lean air-fuel ratio which is higher than the predetermined weak lean air-fuel ratio. Therefore, it is also possible to suppress the opportunities to decrease the air-fuel ratio of the air-fuel mixture to the predetermined weak lean air-fuel ratio so that there are few opportunities. As a result, the amount of $NH_3$ emitted from the SCR catalyst can be suppressed to be not more than the permissible amount, while suppressing the deterioration of the fuel consumption ratio so that the deterioration is small.

REFERENCE SIGNS LIST

1 internal combustion engine
2 fuel injection valve 3 exhaust pipe
4 first catalyst casing
5 second catalyst casing
6 third catalyst casing
7 ECU
8 air-fuel ratio sensor
10 first $NO_X$ sensor
11 second $NO_X$ sensor
12 temperature sensor

The invention claimed is:

1. A control apparatus for an internal combustion engine which is provided with a first exhaust gas purification apparatus that is arranged in an exhaust passage and includes a $NO_x$ storage reduction catalyst, and a second exhaust gas purification apparatus that is arranged in the exhaust passage downstream from the first exhaust gas purification apparatus and includes a selective catalytic reduction catalyst, wherein the control apparatus comprising a controller including at least one processor configured to:

acquire an $NH_3$ adsorption amount as an amount of $NH_3$ adsorbed to the selective catalytic reduction catalyst;

detect a temperature of the selective catalytic reduction catalyst; and operate when the $NH_3$ adsorption amount of the selective catalytic reduction catalyst is not less than a predetermined threshold value such that an air-fuel ratio of an air-fuel mixture to be combusted in the internal combustion engine is controlled to a predetermined lean air-fuel ratio which is higher than a theoretical air-fuel ratio if the temperature of the selective catalytic reduction catalyst is not less than a lower limit temperature at which $NH_3$ can be oxidized, while the air-fuel ratio of the air-fuel mixture to be combusted in the internal combustion engine is controlled to a predetermined weak lean air-fuel ratio which is lower than the predetermined lean air-fuel ratio and which increases an amount of $NO_x$ flowing out from the $NO_x$ storage reduction catalyst per unit time as compared with an amount of $NO_x$ stored in the $NO_x$ storage reduction catalyst per unit time if the temperature of the selective catalytic reduction catalyst is less than the lower limit temperature.

2. The control apparatus for the internal combustion engine according to claim 1, wherein the controller executes a temperature raising process for raising a temperature of the selective catalytic reduction catalyst if the temperature of the selective catalytic reduction catalyst is not less than a predetermined temperature which is higher than the lower limit temperature when the $NH_3$ adsorption amount of the selective catalytic reduction catalyst is not less than the predetermined threshold value.

3. The control apparatus for the internal combustion engine according to claim 2, wherein the controller performs the temperature raising process by retarding an ignition timing of the internal combustion engine.

4. The control apparatus for the internal combustion engine according to claim 2, wherein the controller performs the temperature raising process by advancing a valve opening timing of an exhaust valve of the internal combustion engine.

5. The control apparatus for the internal combustion engine according to claim 1, wherein the first exhaust gas purification apparatus includes a three-way catalyst in addition to the $NO_x$ storage reduction catalyst.

6. The control apparatus for the internal combustion engine according to claim 2, wherein the first exhaust gas purification apparatus includes a three-way catalyst in addition to the $NO_x$ storage reduction catalyst.

7. The control apparatus for the internal combustion engine according to claim 3, wherein the first exhaust gas purification apparatus includes a three-way catalyst in addition to the $NO_x$ storage reduction catalyst.

8. The control apparatus for the internal combustion engine according to claim 4, wherein the first exhaust gas purification apparatus includes a three-way catalyst in addition to the $NO_x$ storage reduction catalyst.

* * * * *